US 9,007,656 B2

(12) United States Patent
Shen et al.

(10) Patent No.: US 9,007,656 B2
(45) Date of Patent: Apr. 14, 2015

(54) METHOD, AN APPARATUS AND A PRINTING EQUIPMENT FOR PRINTING DOCUMENTS

(71) Applicants: Peking University Founder Group Co., Ltd., Beijing (CN); Beijing Founder Electronics Co., Ltd., Beijing (CN)

(72) Inventors: Jinghua Shen, Beijing (CN); Haifeng Li, Beijing (CN); Yanman Ma, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 0 days.

(21) Appl. No.: 14/084,897

(22) Filed: Nov. 20, 2013

(65) Prior Publication Data

US 2014/0153008 A1   Jun. 5, 2014

(30) Foreign Application Priority Data

Dec. 3, 2012  (CN) .......................... 2012 1 0511236

(51) Int. Cl.
*G06K 15/02* (2006.01)
*H04N 1/387* (2006.01)

(52) U.S. Cl.
CPC ..................................... *H04N 1/387* (2013.01)

(58) Field of Classification Search
None
See application file for complete search history.

(56) References Cited

U.S. PATENT DOCUMENTS

| 2003/0086098 | A1* | 5/2003 | Sesek et al. ..................... 358/1.1 |
| 2006/0059271 | A1* | 3/2006 | Kato .............................. 709/238 |
| 2006/0103872 | A1* | 5/2006 | Shimogori .................. 358/1.15 |
| 2010/0053688 | A1* | 3/2010 | Shinagawa ................... 358/3.24 |

* cited by examiner

*Primary Examiner* — Kimberly A Williams
(74) *Attorney, Agent, or Firm* — Hamre, Schumann, Mueller & Larson, P.C.

(57) ABSTRACT

The present invention provides a method, an apparatus and a printing equipment for printing documents, comprising: obtaining the name of the color document; retrieving the printing step information for the color document, according to the name of the color document, and determining if the printing step information for the color document is complete; printing the color document, according to the printing step information, in the case that the printing step information for the color document is complete. Thus, it is possible to avoid the problem of consuming a large amount of time caused by processing the color document at each time of printing it, so as to greatly increase the speed and efficiency of cyclic printing documents.

16 Claims, 4 Drawing Sheets

METHOD, AN APPARATUS AND A PRINTING EQUIPMENT FOR PRINTING DOCUMENTS

TECHNICAL FIELD

The present invention relates to the technical field of color printing, specifically relates to a method, an apparatus and a printing equipment for printing documents.

BACKGROUND

Currently, digital printing technology is more and more popular, and digital printing is applied more and more widely, especially, the needs and the applications of printing color digital documents are developed rapidly. The standard for the printing equipment that print color documents has also been greatly improved.

In the prior art, the color mode of CMYK (Cyan, Magenta, Yellow, and Black) is often used in printing color documents to identify the spot colors in the color documents. In order to make the spot color correction to be more accurate, cyclic color correction steps are adopted when the printing software in the printing equipment applies a spot color calibrating to the color documents. In the cyclic color correction steps, it needs to print a same color document that contains multiple spot colors for multiple times, before which, the color digital printing equipment needs to apply multiple process steps to the color documents. However, due to it consumes relatively long time to execute above mentioned process steps, usually for 3-4 minutes, and due to above mentioned process applied to the color document is required at each time of printing while the same color document is circularly printed for multiple times, it caused the cyclic print of color documents to consume relatively long time, and the printing efficiency in cyclic print of the color documents will be relatively poor.

SUMMARY

In order to solve the problem described above, the present invention provides a method, an apparatus and a printing equipment for printing documents, so as to solve the problem of low printing efficiency in cyclic print of color documents in the prior art.

To this end, the present invention provides a method for printing documents, comprising:

obtaining the name of the color document;

retrieving the printing step information for the color document, according to the name of the color document, and determining whether the printing step information for the color document is complete.

In the case that the printing step information for the color document is complete, the color document is printed according to the printing step information.

Wherein, the method for printing documents further comprises:

In the case that the printing step information for the color document is not complete, the color document is processed to obtain the printing step information;

Printing the color document according to the printing step information.

Wherein, processing the color document to obtain the printing step information further comprises:

Storing the printing step information for the color document.

Wherein, printing the color document according to the printing step information further comprises: Executing a color correction process to the color document.

Wherein, the printing step information comprises:

The information of a rasterization process, a halftoning process and a halftone dots realization process that applied to the color document.

The present invention also provides an apparatus for printing documents, which comprises:

A obtaining module, configured to obtain the name of the color document;

A retrieving module, configured to retrieve printing step information for the color document according to the name of the color document, and determine whether the printing step information for the color document is complete;

A printing module, configured to, in the case that the printing step information for the color document is complete, print the color document according to the printing step information.

Wherein, the apparatus for printing documents also comprises:

A processing module: configured to, in the case that the printing step information for the color document is not complete, process the color document to obtain the printing step information for it.

Wherein, the apparatus for printing documents also comprises:

A storing module: configured to store the printing step information for the color document obtained from the process executed by the processing module.

Wherein, the apparatus for printing documents also comprises:

A color correction module, configured to process color correction to the color document.

The present invention also provides a printing equipment, which includes any of the apparatus for printing documents mentioned above.

The present invention achieved the following beneficial effects:

The method for printing documents according to the present invention, in the present embodiment, retrieving the printing equipment, according to the name of the color document, to see whether the complete printing step information for the color document is stored in the printing equipment, in the case that the complete printing step information for the color document is stored in the printing equipment, the printing equipment directly prints the color document circularly according to the printing step information, thereby it is possible to avoid the problem of consuming a large amount of time by processing the color document at every time of printing, and so as to increase the speed and efficiency in circularly printing files greatly.

For the apparatus and the printing equipment for printing documents according to the present invention, the retrieving module retrieves the printing step information for the color document according to the name of the color document, and determine that whether the printing step information for the color document is complete, in the case that the printing step information is complete, the printing module directly calls the printing step information to print the documents, thereby it is possible to avoid the problem of low efficiency by circularly processing the color documents while printing the color documents circularly, so as to reduce largely the time required to print documents circularly, and increase the speed and efficiency in circularly printing files.

DETAILED DESCRIPTION

In order to enable the technical solutions of the present invention to be better understood by those skilled in the art, the method, the apparatus and the printing equipment for printing documents provided by the present invention will be described in detail with reference to the figures below.

Figure 1:
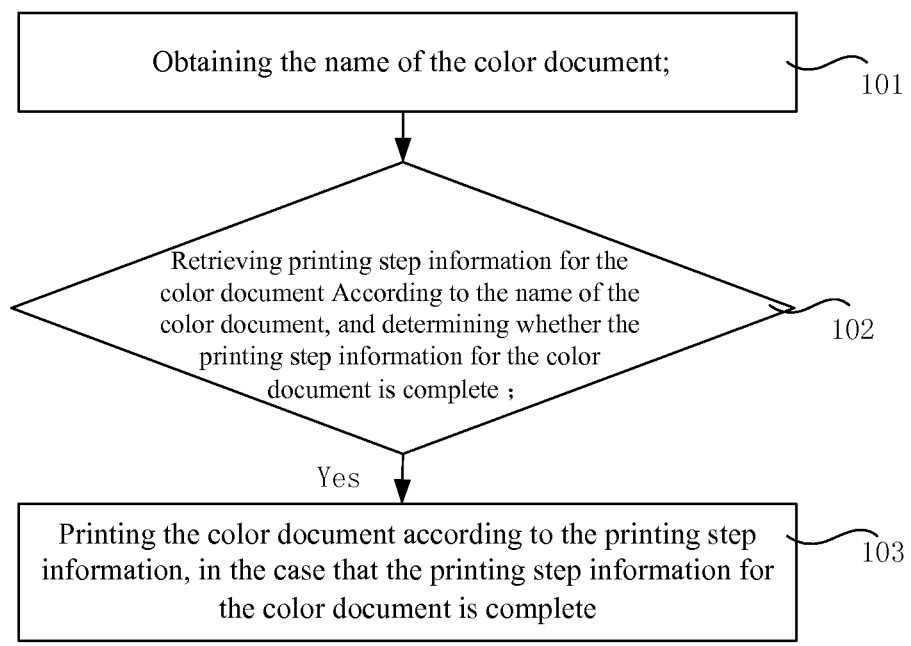
FIG. 1 is a flowchart illustrating the first embodiment of the method for printing documents according to the present invention.

FIG. 1 is a flowchart illustrating the first embodiment of the method for printing documents according to the present invention. As shown in FIG. 1, the flowchart of the first embodiment of the method for printing documents according to the present embodiment specifically including the following work steps:

Step 101, obtaining the name of a color document.

In this step, when it is needed to print color documents, the printing equipment needs to obtain the name of a color document first, and then proceeds to step 102.

Step 102, retrieve the printing step information for the color document, according to the name of the color document, and determine whether the printing step information for the color document is complete.

In this step, the printing equipment retrieves its store unit, to determine whether the complete printing step information for printing the color documents has been stored therein, according to the name of the color document. The printing equipment will process the color document to obtain a complete printing step information thereof, if the complete printing step information is not stored in the store unit; otherwise, it will proceed to step 103 if the complete printing step information has been stored in the store unit.

In this embodiment, the printing step information includes information on the processes of rasterization, halftoning and realization of the halftone dots that applied to the color document. The printing equipment prints the color document according to the printing step information, wherein, all of the specific processes of rasterization process, halftoning process and halftone dots realization process that applied to the color document are well known in prior art, which will not be repeat described herein. Wherein, it is also possible to name the document which stores the printing step information for the color document with other mapping relationships.

Step 103, printing the color document according to the printing step information, in the case that the printing step information for the color document is complete.

In this step, due to the complete printing step information for the color document has been stored in the store unit, the printing equipment is able to call the printing step information directly, it is possible to read the printing step information for the color document directly to execute a color correction process, and then to print the color document, without executing the rasterization process, halftoning process and halftone dots realization process to the color document.

In this embodiment, retrieving the printing equipment, according to the name of the color document, to determine whether the complete printing step information for the color document is stored. The printing equipment directly prints the color document circularly according to the printing step information, when the complete printing step information of the color document is stored in the printing equipment, thereby, the problem of consuming a large number of time by processing the color document at each time of printing is avoided, thus to greatly increase the speed and efficiency of circularly printing files.

Figure 2:
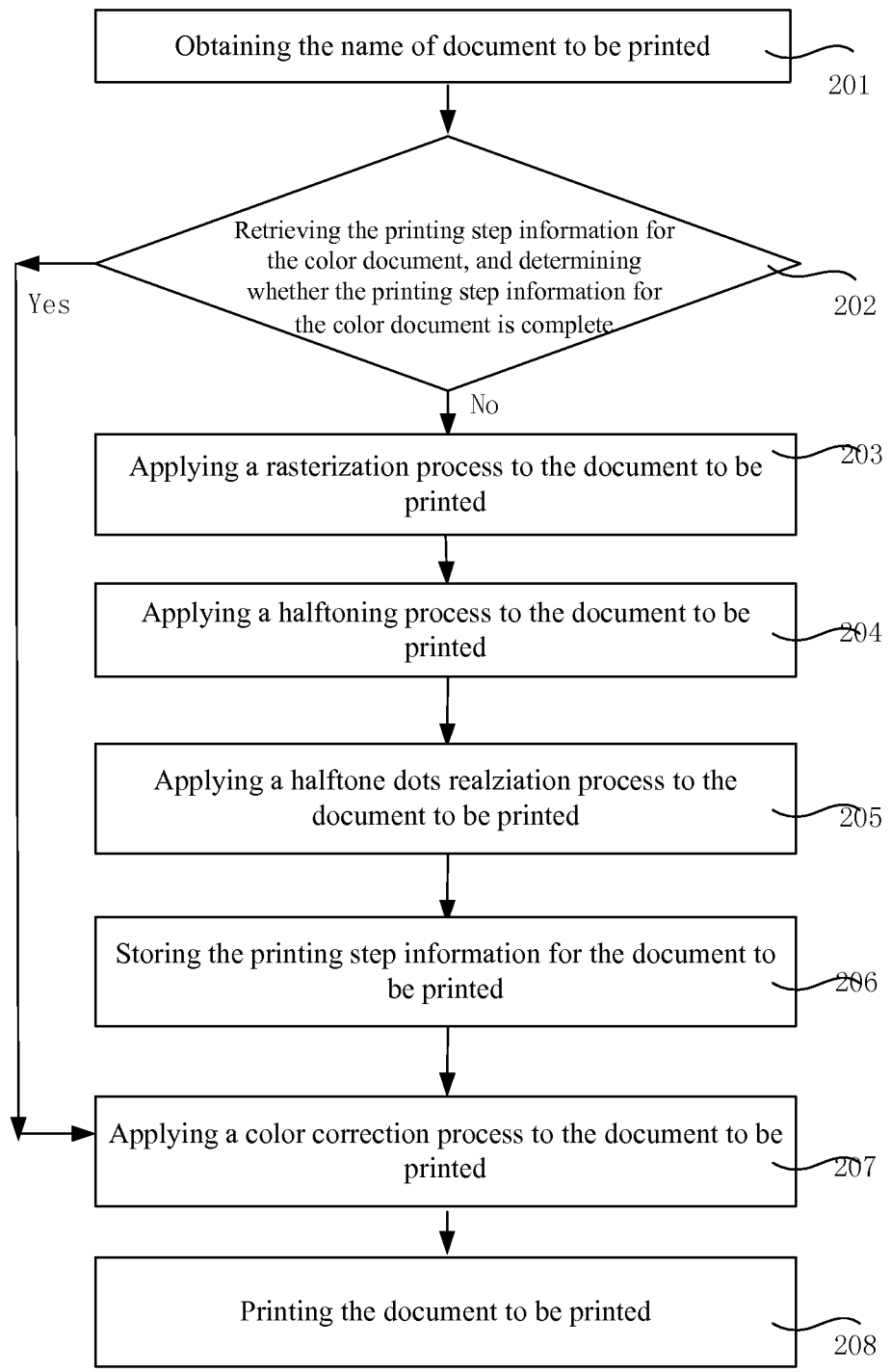
FIG. 2 is a flowchart illustrating the second embodiment of the method for printing documents according to the present invention.

FIG. 2 is a flowchart illustrating the second embodiment of the method for printing documents according to the present invention. As shown in FIG. 2, the flow of the second embodiment of the method for printing documents according to the present embodiment specifically includes the following work steps:

Step 201, obtaining the name of the color document.

In this embodiment, a PDF color document named A is used as an example to present the technical scheme. When it is needed to print document A, the printing equipment obtains the name of document A first, then proceed to step 202.

Step 202, retrieving the printing step information for the color document, and determining whether the printing step information for the color document is complete.

In this step, the printing equipment retrieves its store unit and determine whether the complete printing step information for document A is stored therein, according to that the name of the color document is A, and the printing step information can be stored in the form of TIF file. If the complete printing step information for document A is not stored in the store unit, then proceed to step 203; if the complete printing step information is stored in the store unit, the printing step information of document A is read, and then proceed to step 207

Step 203, executing a rasterization process to the color document.

In this step, a rasterization process is applied to document A, the multicolor page data of document A after rasterization process can be identified by 8 bits dots matrix, and then proceed to step 204.

Step 204, applying a halftoning process to the color document.

In this step, a halftoning process is applied to document A which has suffered the rasterization process, the multicolor page data of document A after halftoning process can be identified by 1 bit dots matrix, and then proceed to step 205.

Step 205, applying a halftone dots realization process to the color document.

In this step, apply a halftone dots realization process to document A that has been processed by halftoning process, the multicolor page data of document A after the halftone dots realization process is converted to 8 bits dot matrix to be identified, thereby the complete printing step information for document A is obtained, and then proceed to step 206.

Step 206, storing the printing step information for the color document.

In this step, the printing equipment stores the print information step for document A obtained by the processes through steps 203-205, for example, the printing step information for the document A can be stored in a assigned catalog of the store unit in the form of TIF files. In the present embodiment, it is assumed that document A contains 50 spot colors, the printing step information which has been saved as TIF files are successively named, according to the color surface names, as A_C.tif, A_M.tif, AY.tif, A_K.tif, A_S1.tif, A_S2.tif, . . . , A_S50.tif, in a total of 54 files. Wherein, A_C.tif identifies the TIF file that is saved in C color page dot matrix, A_M.tif identifies the TIF file that is saved in M color page dot matrix, A_Y.tif identifies the TIF file that is saved in Y color page dot matrix, A_K.tif identifies the TIF file that is saved in K color page dot matrix, A_S1.tif identifies the TIF file that is saved in the first spot color color page dot matrix, . . . , A_S50.tif identifies the TIF file that is saved in the 50th spot color color page dot matrix, thereby, 54 tif files are obtained. Save all of the 54 TIF files described above into the assigned catalog, and then proceed to step 207.

Step 207, applying a color correction process to the color document.

In this step, the spot color value of each color page of document A can be modified or adjusted by the user, to make the printed document matching the user's requirements, and then proceed to step 208.

Step 208, printing the color document.

In this step, the printing equipment is driven to print document A, thereby the printout of document A is obtained.

In the present embodiment, document A contains 50 spot colors, when document A is printed, the printing equipment retrieve the assigned catalog of the store unit first, to determine whether the printing step information for document A is stored therein. If the printing step information for document A does not exist in the assigned catalog or the printing step information therein is not complete, the printing equipment will submit document A to be processed to obtain the complete printing step information for document A, and then the printing step information for document A is saved as TIF files in the assigned catalog in the form of 8 bits dot matrix, i.e., A_C.TIF identifies the TIF file saved in C color page dot matrix, A_M.TIF identifies the TIF file saved in M color page dot matrix, A_Y.TIF identifies the TIF file saved in Y color page dot matrix, A_K.TIF identifies the TIF file saved in K color page dot matrix, A_S1.TIF identifies the TIF file saved in the first spot color color page dot matrix, . . . , A_S50.tif identifies the TIF file saved in the 50th spot color color page dot matrix, thereby 54 tif files are obtained.

In practical applications, rasterization process, halftoning process and halftone dots realization process are usually required to process the document before printing it, the information obtained from each of above mentioned process steps can be used repeatedly in cyclic print. Therefore, the result of any of the process steps of rasterization process, halftoning process and halftone dots realization process can be stored, so as to utilize these process results directly while circularly printing the document, thereby the process steps corresponding to the process results can be omitted, thus to reduce print time, and increase print efficiency In the present embodiment, during printing a document, if the printing step information for the document does not exist in the assigned catalog, the printing equipment will process the document to obtain the printing step information thereof, and meanwhile, stores the printing step information into the assigned catalog; if the complete printing step information for the document is retrieved in the assigned catalog, the printing equipment will call the printing step information directly to print the document. Thereby it is possible to avoid the problem of consuming a large amount of time by requiring the cyclic processes to the document while printing a same document, and to ensure that the document needs to be processed only once while circularly printing the same document, which increases the speed and efficiency of circularly printing documents greatly.

Figure 3:
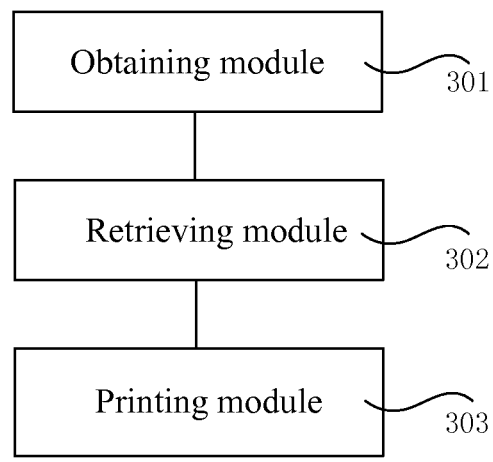
FIG. 3 is a structural schematic illustrating the first embodiment of the apparatus for printing documents according to the present invention.

FIG. 3 is the structural schematic illustrating the first embodiment of the apparatus for printing documents according to the present invention. As shown in FIG. 3, the apparatus for printing documents according to the present embodiment includes: an obtaining module 301, a retrieving module 302 and a printing module 303. Wherein the obtaining module 301 is configured to obtain the name of the color document, the retrieving module 302 is configured to retrieve the printing step information for the color document, according to the name of the color document, and determine whether the printing step information for the color document is complete, and in the case that the printing step information for the color document is complete, the printing module 303 prints the color document according to the printing step information.

In the present embodiment, the retrieving module retrieves the printing step information for the color document according to the name of the color document, and determines whether the printing step information for the color document is complete in the case that the printing step information is complete, the printing module directly call the printing step information to print the document, thereby it is possible to avoid the problem of low efficiency due to that it is needed to execute cyclic processes to the color document while circularly printing the color document, thus to reduce the time consumed by circularly printing documents greatly, and to increase the speed and efficiency of circularly printing documents.

Figure 4:
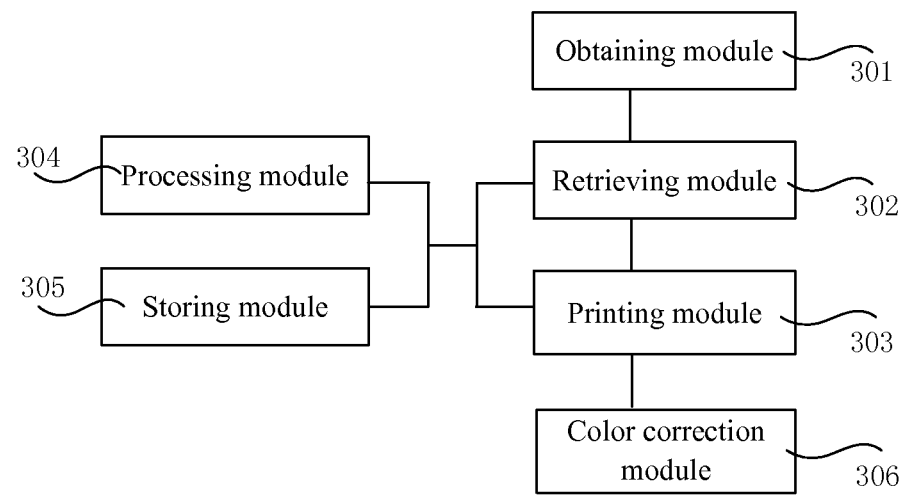
FIG. 4 is a structural schematic illustrating the second embodiment of the apparatus for printing documents according to the present invention.

FIG. 4 is the structural schematic illustrating the second embodiment of the apparatus for printing documents according to the present invention. As shown in FIG. 4, the apparatus for printing documents according to the present embodiment also includes: a processing module 304 and a storing module 305, wherein, in the case that the printing step information for the color document is not complete, the processing module 304 processes the color document to obtain the printing step information; the storing module 305 is configured to store the printing step information for the color document obtained by the processing module 304. In practical applications, the printing step information can be stored in the assigned catalog in the form of TIF file.

Furthermore, the apparatus for printing documents according to the present embodiment can also includes a color correction module 306, which is configured to apply a color correction process to the color documents, so as to obtain the printed documents that meet the needs of users.

In the present embodiment, when the printing equipment prints the color documents for the first time, first, the printing step information for the color document is obtained by the processing module, and the printing step information is stored into the storing module, when the document is printed for a second time, the printing step information stored in the storing module can be called directly, thereby avoid the problem of low efficiency due to that it is needed to process the color document at each time of printing, and thus to reduce the time that taken by circularly printing documents greatly, and to increase the speed and efficiency of circularly printing a file.

The present invention further provides a printing equipment, which includes a processor and a printer, the processor is able to adopt any of the apparatus for printing documents aforesaid, so as to increase the speed and efficiency of the printing equipment in circularly printing documents, which will not be discussed repeatedly herein. In practical applications, the processor can be equipped as a computer.

It will be appreciated that, exemplary embodiments of the present application have been described above with reference to the accompanying drawings. A person skilled in the art should understand that the above embodiments are only cited examples for illustrative purposes, instead of for restricting, any modification, equivalent replacement, etc. which is made in the scope of the protection of the teachings and claims of the present application, should be included within the scope of the protection claimed by this application.

What is claimed is:

1. A method for printing documents, comprising:
obtaining a name of a color document;
retrieving printing step information for the color document according to the name of the color document, wherein the printing step information comprises information on processes of rasterization, halftoning, and realization of the halftone dots that applied to the color document;
determining whether the printing step information for the color document is complete; and
printing, in the case that the printing step information for the color document is complete, the color document according to the printing step information.

2. The method for printing documents according to claim 1, further comprising:
processing the color document, in the case that the printing step information for the color document is not complete, to obtain the printing step information; and
printing the color document according to the printing step information.

3. The method for printing documents according to claim 2, wherein the step of processing the color document to obtain the printing step information further comprises:
storing the printing step information for the color document.

4. The method for printing documents according to claim 1, wherein the step of printing the color document according to the printing step information further comprises:
applying a color correction process to the color document.

5. The method for printing documents according to claim 1, wherein the printing information is stored in a plurality of files.

6. The method for printing documents according to claim 5, wherein the plurality of files are in a form of tagged image file (TIF) format.

7. The method for printing documents according to claim 5, wherein the plurality of files includes:
a file saved in C color page dot matrix;
a file saved in M color page dot matrix;
a file saved in Y color page dot matrix;
and one or more files saved in a spot color (S) color page dot matrix.

8. The method for printing documents according to claim 7, wherein the one or more files saved in the S color page dot matrix corresponds to a number of spot colors contained within the color document.

9. An apparatus for printing documents, comprising:
an obtaining module configured to obtain a name of a color document;
a retrieving module configured to retrieve printing step information for the color document according to the name of the color document, and configured to determine whether the printing step information for the color document is complete, wherein the printing step information comprises information on processes of rasterization, halftoning, and realization of the halftone dots that applied to the color document; and
a printing module configured to print the color document according to the printing step information in the case that the printing step information for the color document is complete.

10. The apparatus for printing documents according to claim 9, further comprising:
a processing module configured to process the color document to obtain printing step information in the case that the printing step information for the color document is not complete.

11. The apparatus for printing documents according to claim 10, further comprising:
a storing module configured to store the printing step information for the color document obtained by the processes executed by the processing module.

12. The apparatus for printing documents according to claim 10, further comprising:
a color correction module configured to execute the color correction to the color document.

13. A printing equipment, comprising the apparatus for printing documents according to claim 9.

14. The printing equipment according to claim 13, wherein the apparatus for printing documents further comprises:
a processing module configured to process the color document to obtain printing step information in the case that the printing step information for the color document is not complete.

15. The printing equipment according to claim 14, wherein the apparatus for printing documents further comprises:
a storing module configured to store the printing step information for the color document obtained by the processes executed by the processing module.

16. The printing equipment according to claim 14, wherein the apparatus for printing documents further comprises:
a color correction module configured to execute the color correction to the color document.

* * * * *